United States Patent
Martin

(10) Patent No.: US 9,864,996 B2
(45) Date of Patent: Jan. 9, 2018

(54) SYSTEM AND METHOD FOR AUTOMATICALLY AUTHENTICATING A CALLER

(71) Applicant: Capital One Financial Corporation, McLean, VA (US)

(72) Inventor: Christopher D. Martin, Midlothian, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 0 days.

(21) Appl. No.: 15/297,453

(22) Filed: Oct. 19, 2016

(65) Prior Publication Data
US 2017/0039573 A1 Feb. 9, 2017

Related U.S. Application Data

(63) Continuation of application No. 14/480,842, filed on Sep. 9, 2014, now Pat. No. 9,501,776.

(60) Provisional application No. 61/875,251, filed on Sep. 9, 2013.

(51) Int. Cl.
| | |
|---|---|
| H04M 1/66 | (2006.01) |
| G06Q 30/00 | (2012.01) |
| H04W 12/06 | (2009.01) |
| H04L 29/06 | (2006.01) |
| H04L 29/08 | (2006.01) |
| H04M 3/51 | (2006.01) |
| H04M 7/00 | (2006.01) |
| H04W 60/00 | (2009.01) |

(52) U.S. Cl.
CPC .......... *G06Q 30/016* (2013.01); *H04L 63/08* (2013.01); *H04L 67/306* (2013.01); *H04M 3/5166* (2013.01); *H04M 7/0024* (2013.01); *H04W 12/06* (2013.01); *H04W 60/00* (2013.01)

(58) Field of Classification Search
CPC .................................................. G06Q 30/016
USPC ....................................................... 455/411
See application file for complete search history.

(56) References Cited

U.S. PATENT DOCUMENTS

| | | |
|---|---|---|
| 7,418,596 B1 | 8/2008 | Carroll |
| 2005/0232225 A1 | 10/2005 | Pelaez et al. |
| 2007/0257982 A1 | 11/2007 | Luo et al. |
| 2009/0037985 A1 | 2/2009 | Bentley et al. |

*Primary Examiner* — Joel Ajayi
(74) *Attorney, Agent, or Firm* — Hunton & Williams LLP

(57) ABSTRACT

Systems and methods include an input interface that receives registration information including a contact number input into a mobile device of a user, a call interface that transmits a call signal to a call center system, wherein the call signal comprises the call signal contact number that placed a call associated with the call signal and a communication interface that transmits the registration information to a profile database that stores the registration information as a profile for authenticating the mobile device user and identifying information from the mobile device of the user during the call. The call center system includes a call authentication processor that retrieves the user profile, an authentication interface that receives the identifying information, and an authentication processor that compares the identifying information with the user profile, and routes the call on an authenticated call path if the identifying information at least partially matches the user profile.

17 Claims, 4 Drawing Sheets

US 9,864,996 B2

SYSTEM AND METHOD FOR AUTOMATICALLY AUTHENTICATING A CALLER

CROSS REFERENCE TO RELATED APPLICATION

The subject application is a Continuation Application of U.S. application Ser. No. 14/480,842, filed Sep. 9, 2014, which claims priority to United States Provisional Application No. 61/875,251 filed Sep. 9, 2013, the contents of which are incorporated herein by reference in their entirety.

FIELD OF THE DISCLOSURE

The present disclosure relates to systems and methods for using a mobile device to securely and automatically authenticate a caller's identity.

BACKGROUND OF THE DISCLOSURE

Currently, when an account holder at a financial institution encounters a problem with his account, he generally must call a customer service representative from the financial institution. As part of the call, the caller must provide authenticating information to the customer service representative (or to an automated system), such as an account number, social security number, and/or vocal sample to provide proof of identity (e.g., authenticate the customer) and proceed with the call and receive assistance. This adds delays and inconvenience for the caller who is trying to resolve an issue or have a question answered and can lead to a poor customer experience.

These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

The following description is intended to convey a thorough understanding of the embodiments described by providing a number of specific example embodiments and details involving systems and methods for automatically authenticating a caller's identity. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs. A financial institution and system supporting a financial institution are used as examples for the disclosure. The disclosure is not intended to be limited to financial institutions only. The description below describes servers, devices, and network elements that may include one or more modules, some of which are explicitly shown, others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 1:
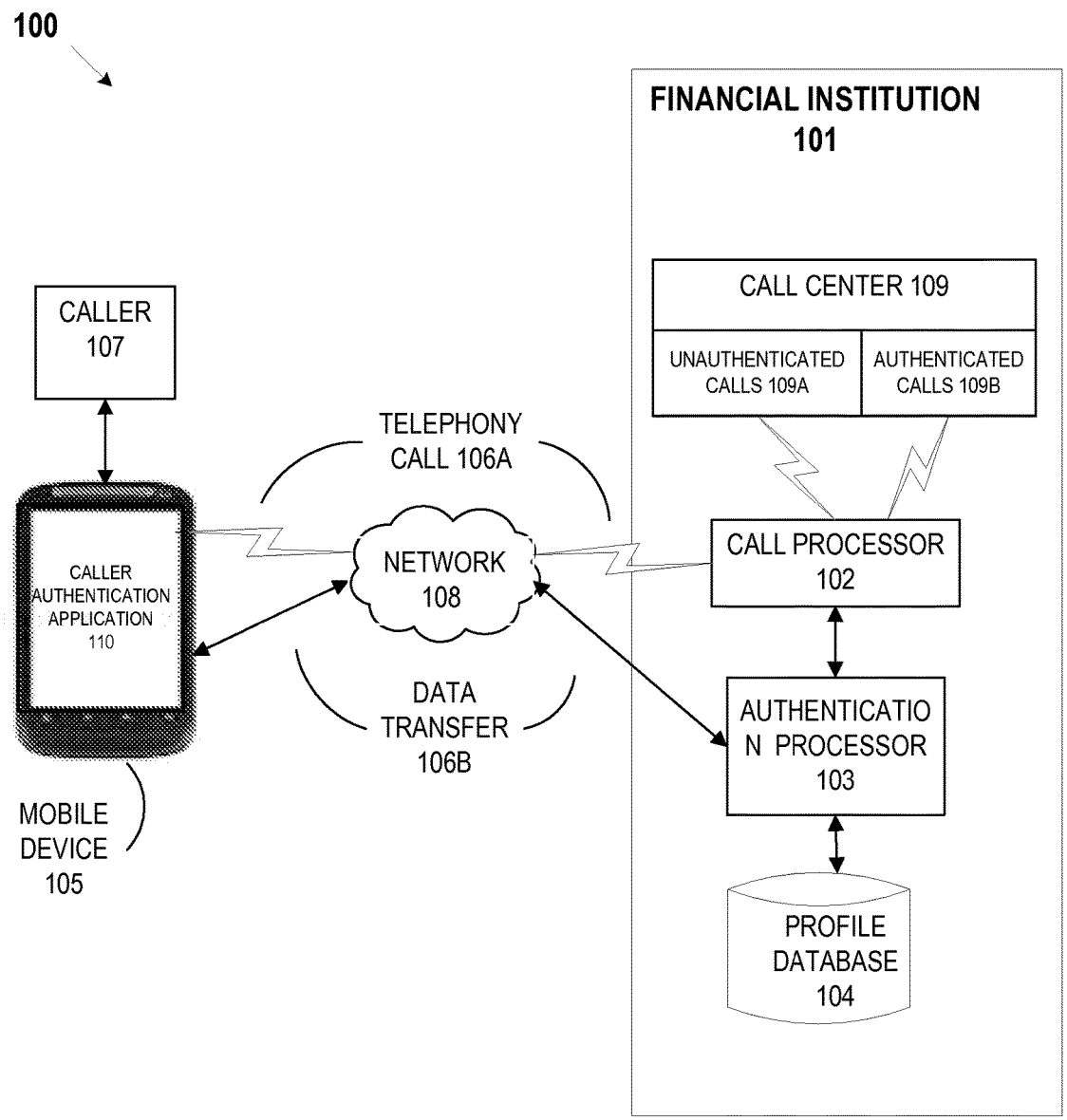
FIG. 1 depicts a schematic diagram of a system for automatically authenticating a caller's identity, according to an example embodiment of the disclosure.

FIG. 1 depicts an example embodiment of a system 100 for automatically authenticating a caller's identity, according to various embodiments of the disclosure. The system may include various network-enabled computer systems, including, as depicted in FIG. 1 for example, a financial institution 101, which may include one or more network-enabled computers, including a call processor 102, an authentication processor 103, and a profile database 104, which may be included as separate processors or combined into device having a single processor or device having the multiple processors. It is also noted that the system 100 illustrates only a single instance of each component. It will be appreciated that multiple instances of these components may be used. Moreover, the system 100 may include other devices not depicted in FIG. 1.

In various embodiments, the authentication processor 103, profile database 104, and/or the call processor 102 may be separate from financial institution 101. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable the creation and provisioning of account services to mobile device 105, such as Caller authentication application 110. In various embodiments, caller authentication application may be associated with and/or integrated into, for example, a mobile application of a financial institution.

The components depicted in FIG. 1 may store information in various electronic storage media, such as, for example, profile database 104. Electronic information, files, and documents may be stored in various ways, including, for example, a flat file, indexed file, hierarchical database, relational database, such as a coupon database created and maintained with software from, for example, Oracle® Corporation, Microsoft® Excel file, Microsoft® Access file, or any other storage mechanism.

The components depicted in FIG. 1 may be coupled via one or more networks, such as, for example, network 108. Network 108 may be one or more of a wireless network, a wired network or any combination of wireless network and wired network. For example, network 108 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 108 may include, without limitation, telephone lines, fiber optics, IEEE Ethernet 902.3, a wide area network ("WAN"), a local area network ("LAN"), or a global network such as the Internet. Also network 108 may support an Internet network, a wireless communication network, a cellular network, or the like, or any combination thereof. Network 108 may further include one network, or any number of the example types of networks mentioned above, operating as a stand-alone network or in cooperation with each other. Network 108 may utilize one or more protocols of one or more network elements to which they are communicatively coupled. Network 108 may translate to or from other protocols to one or more protocols of network devices. Although network 108 is depicted as a single network, it should be appreciated that according to one or more embodiments, network 108 may comprise a plurality of interconnected networks, such as, for example, the Internet, a service provider's network, a cable television network, corporate networks, and home networks.

As shown in FIG. 1, Financial institution 101 may include call center 109. Call center 109 may be configured to receive telephone calls made to financial institution 101, such as customer service calls. Call center 109 may comprise one or more network-enabled computers operated by customer service representatives. Call center 109 may be located separately from financial institution 101, and may be operated by a third party. When caller 107 places a call to financial institution 101, the call may be routed through network 108 to be received at call center 109, as will be explained in greater detail below.

Call center 109 may include a path for unauthenticated calls 109a, and a path for authenticated calls 109b. Unauthenticated calls 109a may be directed to customer service representatives or automated systems (e.g., Interactive Voice Response units (IVRs))) that may request identifying information from the caller before the caller can proceed further. Authenticated calls 109b will be directed to customer service representatives or automated systems that may not request identifying information from the caller, because the identifying information has already been provided to authentication processor 103 and call processor 102, as will be described below.

In various example embodiments, caller 107 may be any individual or entity that desires to contact financial institution 101. Caller 107 may have on or more accounts with financial institution 101. Also, a caller may be a computer system associated with or operated by such an individual or entity.

Financial institution 101 may be, for example, a bank (e.g., a retail bank, direct bank, and/or commercial bank), other type of financial institution, including a credit card and/or debit card provider, brokerage services provider, for example, and/or any other entity that offers accounts to customers. An account may include any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, an account or service that links to an underlying payment account already described, or mobile commerce account. An account may or may not have an associated card, such as, for example, a credit card for a credit account or a debit card for a debit account. The account may enable payment using biometric authentication, or contactless based forms of authentication, such as QR codes or near-field communications. The account card may be associated or affiliated with one or more social networking sites, such as a co-branded credit card.

Caller 107 may have one or more mobile devices, such as mobile device 105. Mobile device 105 may be, for example, a handheld PC, a phone, a smartphone, a PDA, a tablet computer, wearable device, or other device. Mobile device 105 may be able to make telephone calls, such as telephone call 106a. Telephone call 106a may be over network 108. Telephone call 106a may be over a separate network from network 108 (not shown). Telephone call 106a may be a wireless call over a cellular network, a landline call using the public-switched telephone network (PSTN), and/or a Voice over IP (VoIP) call.

Mobile device 105 may include one or more software applications, such as Caller authentication application 110. Caller authentication application 110 may be downloaded onto mobile device 105 over network 108. Caller authentication application 110 may be pre-installed on mobile device 105. For example, caller authentication application 110 may be associated with and/or integrated into, for example, a mobile application of the financial institution. Caller authentication application 110 may be a software application that enables mobile device 105 to transmit information to authentication processor 103, such as data transfer 106b. Telephone call 106a and/or data transfer 106b may utilize Signaling System Number 7 (SS7). Telephone call 106a and/or data transfer 106b also may be transmitted and received utilizing Session Initiation Protocol ("SIP") or H.323. In other embodiments, the telephone call 106a may be transmitted and/or received utilizing using Voice Over IP ("VOIP"). Telephone call 106a and/or data transfer 106b may be transmitted and/or received using Voice Over LTE ("VoLTE") or messaging protocols. Data also may be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data.

Figure 4:
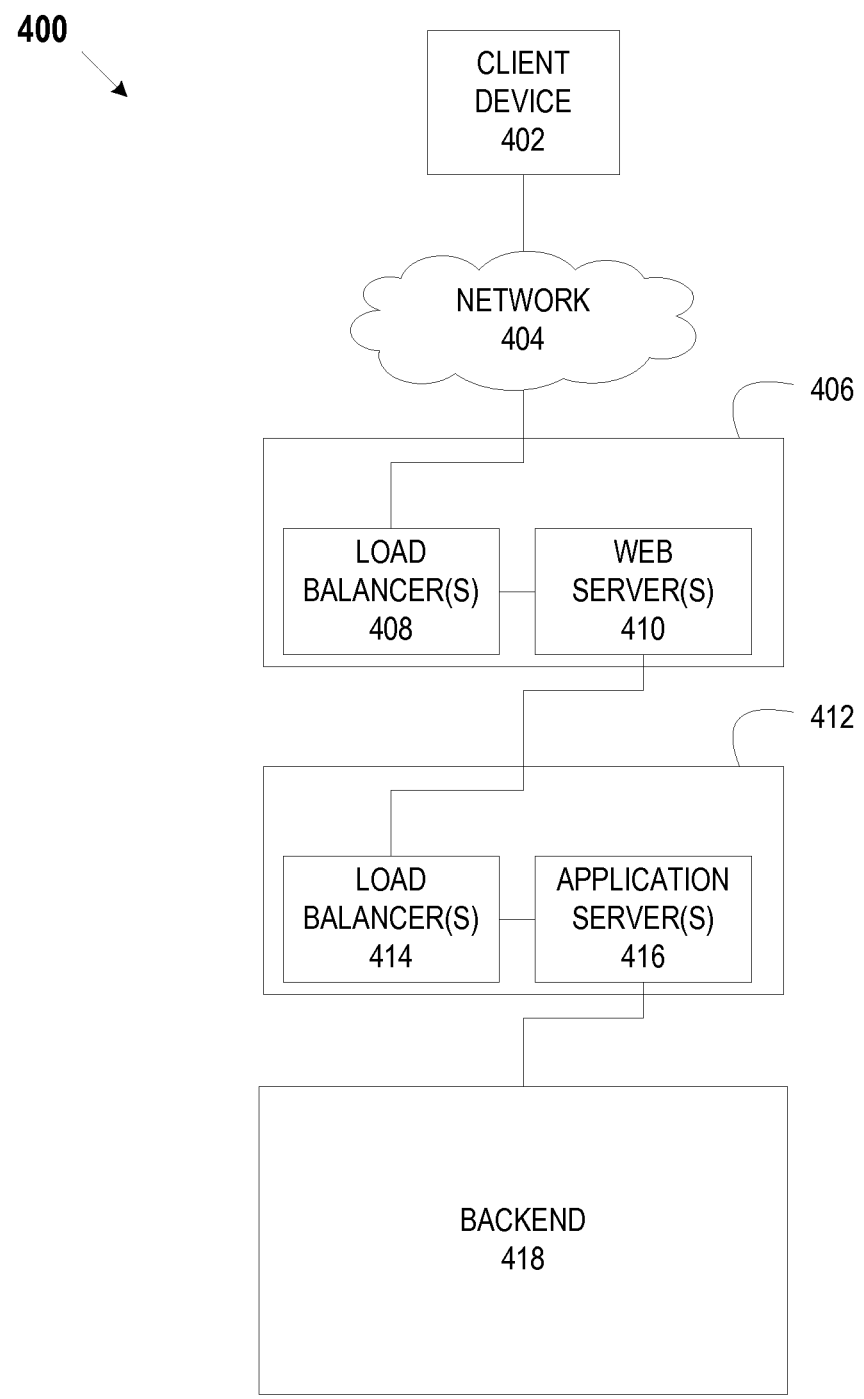
FIG. 4 depicts a schematic diagram of a system for automatically authenticating a caller's identity, according to an example embodiment of the disclosure.

FIG. 4 depicts an example system 400 that may enable a financial institution, for example, to provide network services to its customers. For example, system 400 may enable a user of a client device to use a caller authentication application on a client device to authenticate the caller with the financial institution via a data transfer from, for example, a client device to backend 418. As shown in FIG. 4, system 400 may include a client device 402, a network 404, a front-end controlled domain 406, a back-end controlled domain 412, and a backend 418. Front-end controlled domain 406 may include one or more load balancers 408 and one or more web servers 410. Back-end controlled domain 412 may include one or more load balancers 414 and one or more application servers 416.

Client device 402 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 400 may execute one or more software applications to enable, for example, network communications.

Client device 402 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/ or any other smartphone or like wearable mobile device.

Network 404 may be one or more of a wireless network, a wired network, or any combination of a wireless network and a wired network. For example, network 404 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 404 may include, without limitation, telephone lines, fiber optics, IEEE Ethernet 902.3, a wide area network (WAN), a local area network (LAN) or a global network such as the Internet. Also, network 404 may support an Internet network, a wireless communication network, a cellular network, or the like, or any combination thereof. Network 404 may further include one network, or any number of example types of networks mentioned above, operating as a stand-alone network or in cooperation with each other. Network 404 may utilize one or more protocols of one or more network elements to which they are communicatively couples. Network 404 may translate to or from other protocols to one or more protocols of network devices. Although network 404 is depicted as a single network, it should be appreciated that according to one or more embodiments, network 404 may comprise a plurality of interconnected networks, such as, for example, the Internet, a service provider's network, a cable television network, corporate networks, and home networks.

Front-end controlled domain 406 may be implemented to to provide security for backend 418. Load balancer(s) 408 may distribute workloads across multiple computing resources, such as, for example computers, a computer cluster, network links, central processing units or disk drives. In various embodiments, load balancer(s) 410 may distribute workloads across, for example, web server(S) 416 and/or backend 418 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 408 may include software that monitoring the port where external clients, such as, for example, client device 402, connect to access various services of a financial institution, for example. Load balancer(s) 408 may forward requests to one of the application servers 416 and/or backend 418 servers, which may then reply to load balancer 408. This may allow load balancer(s) 408 to reply to client device 402 without client device 402 ever knowing about the internal separation of functions. It also may prevent client devices from contacting backend servers directly, which may have security benefits by hiding the structure of the internal network and preventing attacks on backend 418 or unrelated services running on other ports, for example.

A variety of scheduling algorithms may be used by load balancer(s) 408 to determine which backend server to send a request to. Simple algorithms may include, for example, random choice or round robin. Load balancers 408 also may account for additional factors, such as a server's reported load, recent response times, up/down status (determined by a monitoring poll of some kind), number of active connections, geographic location, capabilities, or how much traffic it has recently been assigned.

Load balancers 408 may be implemented in hardware and/or software. Load balancer(s) 408 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 410 may include hardware (e.g., one or more computers) and/or software (e.g., one or more applications) that deliver web content that can be accessed by, for example a client device (e.g., client device 402) through a network (e.g., network 404), such as the Internet. In various examples, web servers, may deliver web pages, relating to, for example, online banking applications and the like, to clients (e.g., client device 402). Web server(s) 410 may use, for example, a hypertext transfer protocol (HTTP or sHTTP) to communicate with client device 402. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 410 may respond with the content of that resource or an error message if unable to do so. The resource may be, for example a file on stored on backend 418. Web server(s) 410 also may enable or facilitate receiving content from client device 402 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 410 can be scripted in separate files, while the actual server software remains unchanged.

Load balancers 414 may be similar to load balancers 408 as described above.

Application server(s) 416 may include hardware and/or software that is dedicated to the efficient execution of procedures (e.g., programs, routines, scripts) for supporting its applied applications. Application server(s) 416 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 416 may act as a set of components accessible to, for example, a financial institution or other entity implementing system 400, through an API defined by the platform itself. For Web applications, these components may be performed in, for example, the same running environment as web server(s) 410, and application servers 416 may support the construction of dynamic pages. Application server(s) 416 also may implement services, such as, for example, clustering, fail-over, and load-balancing. In various embodiments, where application server(s) 416 are Java application servers, the web server(s) 416 may behaves like an extended virtual machine for running applications, transparently handling connections to databases associated with backend 418 on one side, and, connections to the Web client (e.g., client device 402) on the other.

Backend 418 may include hardware and/or software that enables the backend services of, for example, a financial institution or other entity that maintains a distributes system similar to system 400. For example, backend 418 may include, a system of record, online banking applications, a rewards platform, a payments platform, a lending platform, including the various services associated with, for example, auto and home lending platforms, a statement processing platform, a call center system, a caller authentication system, one or more platforms that provide mobile services, one or more platforms that provide online services, a card provisioning platform, a general ledger system, and the like. Backend 418 may be associated with various databases, including account databases that maintain, for example, customer account information, product databases that maintain information about products and services available to customers, content databases that store content associated with, for example, a financial institution, and the like. Backend 418 also may be associated with one or more servers that enable the various services provided by system 400.

Figure 2:
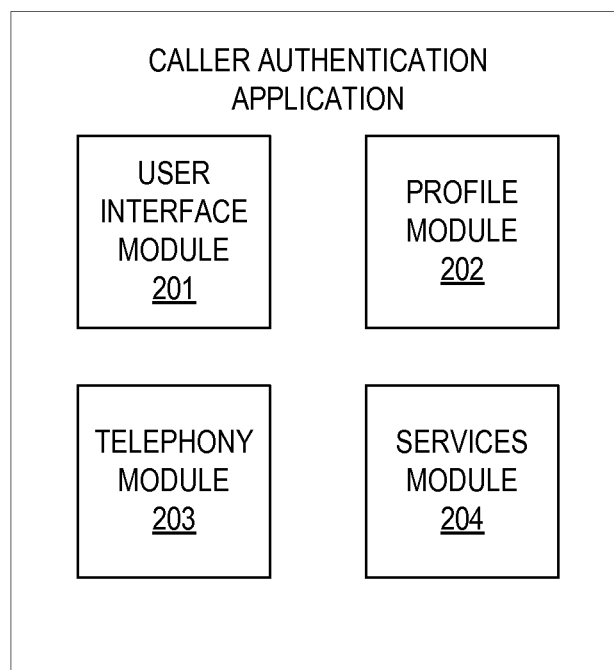
FIG. 2 depicts a diagram of a system for automatically authenticating a caller's identify, according to an example embodiment of the disclosure.

Referring now to FIG. 2, FIG. 2 is a schematic diagram of the components of the Caller authentication Application 110 according to an example embodiment of the disclosure. Caller authentication application 110 may be a stand-alone application on the mobile device that provides the functionality described herein. As noted above, the functionality of the caller authentication application 110 may be included as part of a larger mobile application for mobile banking, such as a mobile banking application provided by financial institution 101 and/or a third party.

As shown in FIG. 2, Caller authentication application 110 may include one or more modules to provide various functionalities associated with providing automatic caller identification in accordance with the embodiments of the present disclosure. In the example embodiment shown in FIG. 2, Caller authentication application 110 may include a user interface module 201, a profile module 202, a telephony module 203, and a services module 204. The operation of these modules will be explained in greater detail in connection with FIGS. 1 and 2.

User interface module 201 may provide caller 107 with an interactive series of displays on a mobile device (e.g., mobile device 105) that allow caller 107 to input information using a keypad or touchscreen on mobile device 105. When a caller 107 activates Caller authentication application 110 on his mobile device 105 for the first time, user interface module 201 may prompt caller 107 to register his identifying information. Identifying information may be a username, a password, social security number, one or more account numbers for accounts that caller 107 has with financial institution 101, name, address, one or more phone numbers associated with mobile device 105, email address, and biometric information. The financial institution may predetermine or preselect which identifying information it will require to authenticate a caller. The financial institution may, from time-to-time, change this identifying information and require the user to re-register the required identifying information. This identifying information may be provided to profile module 202. Thereafter, when caller 107 activates Caller authentication application 110, user interface module 201 may prompt the caller to enter the username and/or password in order to proceed. User interface module 201 also may prompt the caller to provide biometric information (such as a fingerprint, retinal scan, or voice sample) in order to proceed.

Profile module 202 may store the identifying information received from user interface module 201. In various embodiments, profile module 202 may store identifying information in, for example, a universal integrated circuit card (UICC) and/or secure element associated with the mobile device. The first time profile module 202 receives the identifying information, profile module 202 may register the identifying information with financial institution 101 by securely transmitting the identifying information to authentication processor 103 using data transfer 106b. Data transfer 106b may be an encrypted data transfer. Authentication processor 103 may compare the identifying information to account information stored at financial institution 101 to ensure that the user associated with the identifying information has an account with financial institution 101. Authentication processor 103 may then store the identifying information in profile database 104 where it is associated with caller 107. At this point, caller 107 will have a profile in profile database 104 that includes the identifying information, account number(s), caller 107's telephone number(s) for mobile device 105, and other information that uniquely identifies caller 107.

Caller 107 also may register the identifying information directly to financial institution 101 using one or more websites provided by, for example, financial institution 101 and/or a third party associated with financial institution 101.

Telephony module 203 may allow caller 107 to make a telephone call to financial institution 101 and/or call center 109. Telephony module 203 may provide caller 107 with an interface to dial a phone number associated with financial institution 101, or click or press a hyperlink or button to automatically dial the number for financial institution 101. When caller 107 dials the number for financial institution 101 and/or call center 109, telephony module 203 may interact with mobile device 105 (via, for example, an application programming interface (API) on the mobile device) to place the call (for example, via telephone call 106a) to financial institution 101. Telephony module 203 also may be incorporated in a mobile device and, in such an embodiment, caller authentication application may include an API to interact with telephony module 203. At the same time, telephony module 203 may signal profile module 202 to securely transmit caller 107's identifying information to authentication processor 103 (for example, via data transfer 106*b*). This process will be described in greater detail in connection with FIG. 3.

In various embodiments, telephony module 203 may be configured to recognize when caller 107 dials the number associated with financial institution 101 and/or call center 109 from mobile phone 105, even if caller 107 has not opened the Caller authentication application 110. If telephony module 203 detects that caller 107 has dialed the number for financial institution 101, telephony module 203 may generate an alert to caller 107 on mobile device 105 and ask them to confirm the call. If caller 107 confirms, such as by entering a username, password, biometric information, or other identifying information, telephony module 203 may signal profile module 202 to transmit the identifying information to authentication processor 103. In other embodiments, profile module 202 may automatically transmit the identifying information to authentication processor 103 when telephony module 203 detects a call being made by caller 107 to financial institution 101.

Services module 204 may be configured to present caller 107 with one or more services options that caller 107 can select for transmitting to financial institution 101 along with the telephone call 106*a*. The services options may allow the caller to specify the type of service or question(s) that the caller would like answered. For example, the services options may include "changing account information", "changing contact information", "bill payments", "ordering a new card", "lost/stolen card", "ordering new checks", or other options. Services module 204 may present these options to the caller 107 on one or more interactive screens on mobile device 105 when caller 107 has opened Caller authentication application 110. Services module 204 may present these options to caller 107 when caller 107 dials the number for financial institution 101. Services module 204 may receive the caller's selections and store them. Services module 204 may transmit the services options to authentication processor 103 and/or call processor 102 when caller 107 makes a call to financial institution 101 and/or call center 109.

Once mobile device 105 has initiated telephone call 106*a* to financial services 101 and/or call center 109, the call information may be received by call processor 102. The call information may include the number for mobile device 105. Call processor 102 may compare the call information to the profiles stored in profile database 104. If call processor 102 matches the calling number with a number associated with one of the profiles in profile database 104, call processor 102 may retrieve the profile information and, for example, temporarily store it. In various embodiments, the profile information may be temporarily stored in a queue or stack. Call processor 102 may wait for authentication processor 103 to receive identifying information from mobile device 105, as will be described below. If authentication processor 103 does not receive the correct identifying information within, for example, a predetermined amount of time, call processor 102 may delete the profile from the queue or stack, and automatically route telephone call 106*a* to the path for unauthenticated calls 109*a*. Unauthenticated calls 109*a* may be routed to a customer service representative or automated system that will verbally request identifying information from caller 107, such as through a voice response unit (VRU). Caller 107 must then provide identifying information to the customer service representative or automated system before receiving further assistance.

When mobile device 105 initiates a telephone call 106*a* to financial institution 101 and/or call center 109 (either using Caller authentication application 110 or detected by Caller authentication application 110), profile module 202 may simultaneously transmits at least some of the identifying information to authentication processor 103 via data transfer 106*b*. In various embodiments, the identifying information may be transmitted as one or more secure tokens. The identifying information may be encrypted. Also, user interface module 201 may require the caller to enter a username and/or password or PIN, for example, before profile module 202 transmits the identifying information along with the call.

When authentication processor 103 receives the identifying information, it may compare the received information with the profiles stored in profile database 104. As stated above, if the caller has previously registered identifying information with financial institution 101, that identifying information would be stored in the caller's profile in profile database 104. When authentication processor 103 later receives identifying information as part of the caller placing a call to financial institution 101, authentication processor 103 will compare the received identifying information with the one or more profiles temporarily stored by call processor 102. The received identifying information may include one or more of the caller's account number, SSN, username, password, email address, phone number, physical address, biometric information, and other information that uniquely identifies the caller. If at least some of the received identifying information matches the information in one of the one or more profiles that was retrieved by call processor 102, call processor 102 may route the telephone call received from mobile device 105 to the path for authenticated calls 109*b*. Authenticated calls 109*b* are routed to customer service representative or automated systems at call center 109 that will not request identifying information directly from the caller 107.

For example, if mobile device has the number (925) 123-4567 and places a call to financial institution 101, call processor 102 will receive the call information and compare the number (925-123-4567) with the numbers in each profile in profile database 104. If it finds a match, call processor 102 will retrieve the matching profile and temporarily hold it (for example, in a queue) for a set period of time. The set period of time may be preprogrammed into the call processor 102. It may be, for example, 10 seconds, 15 seconds, 30 seconds, or some other predetermined amount of time. During this period of time, authentication processor 103 may receive identifying information (via, for example, data transfer 106*b*) from the mobile device having the number (925) 123-4567. Authentication processor 103 may compare the received identifying information with the profile or profiles stored in the queue with call processor 102. If at least some of the identifying information matches the profile associated with the number (925) 123-4567 at call processor 102, call processor 102 may determine that the call from (925) 123-4567 is authenticated and will connect the call to the path for authenticated calls 109*b*. In this way, the call from (925) 123-4567 can automatically bypass the path for unauthenticated calls 109*a*, and the caller does not have to go through the extra steps of providing identifying information to an automated system or customer services representative.

In an example embodiment, the mobile device may transmit the services information along with the identifying information to authentication processor 103. If the identifying information is matched to a profile as described above, the call processor 102 may use the services information to connect the call from the mobile device to the correct customer services representative in the path for authenticated calls 109b. For example, if the services information indicates that the caller has lost his card, call processor 102 may receive this information and connect and/or the call to the correct department within call center 109 or financial institution 101 that can address this specific issue.

Figure 3:
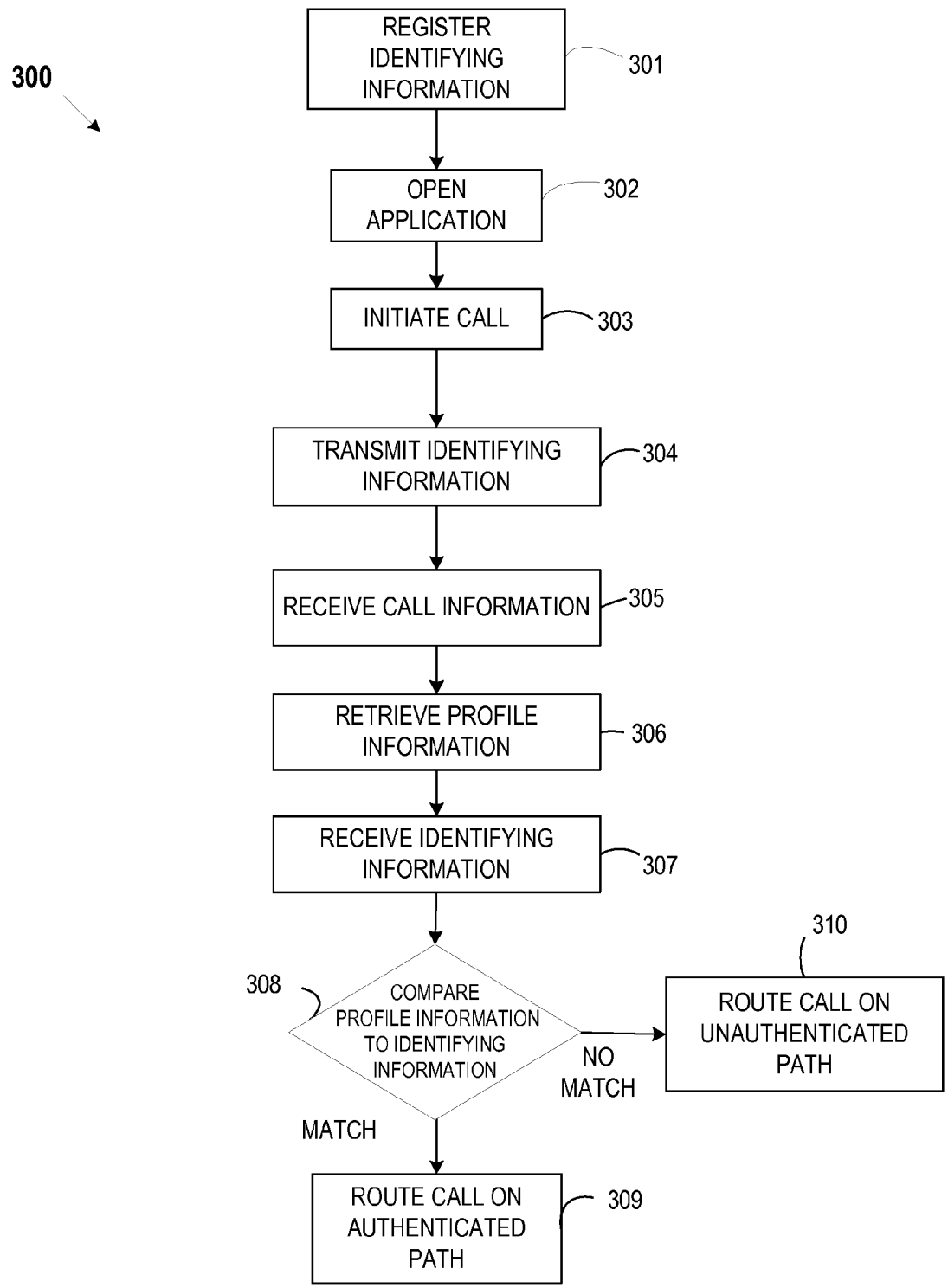
FIG. 3 depicts a block diagram of a method for automatically authenticating a caller's identity, according to an example embodiment of the disclosure.

FIG. 3 is a flow chart illustrating a method 300 for automatically authenticating a caller. The method 300 shown in FIG. 3 may be executed or otherwise performed by one or more combinations of various systems. The method 300 as described below may be carried out by the system for automatically authenticating a caller from a mobile device, as shown in FIGS. 1, 2 and 4, by way of example, and various elements of that system are referenced in explaining the method of FIG. 3. Each block shown in FIG. 3 represents one or more processes, methods, or subroutines in the example method 300. Referring to FIG. 3, the example method 300 may begin at block 301.

At block 301, caller 107 may register identifying information. In one example, caller A may have a credit card account with Bank X. Caller A also may register identifying information with Bank X on a website provided by Bank X. Caller A may use an Caller authentication application on a mobile device (e.g., iPhone) to register his identifying information. The identifying information may, for example, include Caller A's name, username, password, account number, social security number, email address, phone number for the iPhone, street address, work address, biometric information, or other information that personally identifies caller A. The Caller authentication application on the iPhone may store the identifying information on the iPhone as a secure file and/or in a UICC or secure element. The financial institution may create a profile for caller A and store the identifying information with that profile in a database, associated with caller A's phone number for his iPhone. Method 300 may proceed to block 302.

At block 302, caller A may open the Caller authentication application on his iPhone. The Caller authentication application may present a login screen and require caller A to input a username and/or password. The Caller authentication application may require caller A to input, for example, biometric information, such as a voice sample or a fingerprint. If caller A supplies the correct information, method 300 may proceed to block 303. If caller A does not supply the correct information, the Caller authentication application may provide one or more notifications to caller A and request reentry the correct information. The Caller authentication application login screen may allow caller A to contact financial institution 101 to request a new username and/or password.

At block 303, caller A may initiate a call to Bank X. The call may be a wireless telephone call, for example. The call also may be a VOIP call. The call may be over a landline. Caller A may use the Caller authentication application on the iPhone to dial the number for customer service at Bank X. Caller A may use the default phone interface on his iPhone and dial the number for Bank X, and the Caller authentication application on his iPhone may automatically detect this action. The call may be routed to Bank X through one or more networks as explained above.

In an example embodiment, when caller A dials the number for Bank X, the Caller authentication application may prompt the caller to select one or more service options. Each service option may indicate a reason for the call. In this example, Caller A may have previously lost his credit card and may select a "lost card" service option on the touchscreen for his iPhone.

At block 304, the Caller authentication application may transmit identifying information to financial institution 101 at or near the time when the call is initiated at block 303. The identifying information may have been previously stored on caller A's iPhone, as described in block 301. The identifying information may have been previously registered with Bank X, as described in block 301. The identifying information may include the caller's account number, social security number, phone number, email addresses, physical address, full name, birthdate, biometric information, username, password, or other information that uniquely identifies caller A. The Caller authentication application may also transmit the services information that caller A selected at block 303. In one embodiment, the Caller authentication application may require caller A to enter his username and/or password before transmitting the identifying information.

At block 305, the Bank X may receive the call information. Call information may be received by call processor 102. Call information may indicate that caller A is trying to contact Bank X in order to speak with customer services. Call information may include the phone number for caller A's iPhone.

At block 306, call processor 102 may retrieve profile information for caller A using the phone number from the call information. Profile information may be stored in profile database 104. Call processor 102 may match the calling number with caller A's profile. Call processor 102 may store caller A's profile in a queue for a predetermined amount of time. The predetermined amount of time may be 30 seconds.

At block 307, authentication processor 103 may receive the caller A's identifying information. The identifying information may be received over a network as encrypted data. Authentication processor 103 may decrypt the identifying information. The identifying information may be transmitted via, for example, a data transfer.

At block 308, authentication processor 103 may compare the received identifying information with the profile (or profiles) temporarily stored with call processor 102. The received identifying information may include an account number that matches with the account number in caller A's profile that was retrieved by call processor 102 in step 306. The received identifying information may include, for example, a social security number that matches the social security number in caller A's profile. The received identifying information may include a voice sample that matches with a voice sample in caller A's profile. If one or more pieces of the identifying information received in step 308 match with one or more pieces of the profile retrieved in step 306, method 300 proceeds to block 309. Otherwise, method 300 proceeds to block 310. Also, if authentication processor 103 does not receive identifying information within a predetermined time after call processor 102 receives the call information, method 300 may proceed to block 310.

At block 309, the call from caller A's iPhone may be routed to an authenticated call path. The call may be routed to a customer services representative or automated system that does not request any additional identifying information from caller A. The call from caller A also may be routed to specific customer services representative or automated system that responds to issues dealing with lost cards—based on the services information provided by caller A.

If there is no match of identifying information, at block 310, the call from caller A's iPhone may be routed to an unauthenticated call path. The call may be routed to a customer services representative or automated system that will request additional identifying information from caller A. This also may occur if authentication processor never received identifying information from caller A's iPhone within the predetermined time after call processor 102 received the call information.

It is further noted that the software described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

I claim:

1. An apparatus comprising:
a display;
an input device;
a memory;
an antenna; and
a microprocessor that:
generates an interactive display on the display that prompts a user to provide identifying information via a caller authentication application, wherein the caller authentication application is integrated with a third party mobile application;
receives, via the input device, identifying information;
stores the identifying information in the memory as a profile for authenticating the user;
registers the identifying information with the third party mobile application;
recognizes when the input device receives an input directing the device via an API that interacts with the caller authentication application to contact a call center system via the antenna;
creates a connection between the device and the call center system via the antenna; and
transmits, upon recognition of an input to contact a call center system, the received identifying information to the call center system in an encrypted data transfer via the antenna,
wherein an authentication processor connected to the call center system:
retrieves the user profile based on the recognition of the input to contact the call center system and temporarily holds the user profile for a predetermined amount of time;
routes the connection on an authenticated path when the identifying information is received at the call center system within a predetermined amount of time and the identifying information at least partially matches the temporarily held user profile, and wherein the authentication processor routes the connection on an unauthenticated path when the identifying information is received within the predetermined amount of time and does not at least partially match the temporarily held user profile.

2. The apparatus of claim 1, wherein the interactive display generated on the display that prompts a user to provide identifying information is a prompt that requests a user to register identifying information.

3. The apparatus of claim 1, wherein the identifying information comprises at least one of: a username, a password, a social security number, an account number, a name, an address, a phone number, an email address, and a biometric data.

4. The apparatus of claim 1, wherein the identifying information is predetermined by the call center system.

5. The apparatus of claim 4, wherein the call center system may change the predetermined identifying information; and wherein the microprocessor further receives data to generate a prompt on the display for the changed predetermined identifying information.

6. The apparatus of claim 1, wherein the memory comprises a secure element, and wherein the identifying information is stored in the secure element.

7. The apparatus of claim 1, wherein at least one of the memory and microprocessor are housed within a universal integrated circuit card (UICC).

8. The apparatus of claim 1, wherein upon receiving, via the input device, identifying information, the device transmits the identifying information to the authentication processor for storage in the user profile.

9. The apparatus of claim 1, wherein the microprocessor recognizes when the input device receives an input directing the device to contact the call center system via the antenna by detecting a particular dialed number via the input device.

10. The apparatus of claim 1, wherein the microprocessor recognizes when the input device receives an input directing the device to contact the call center system by:
detecting the initiation of a authentication application stored on the device; and
receiving an input via the authentication application directing the device to contact the call center system via the antenna.

11. The apparatus of claim 1, wherein the identifying information is transmitted to the call center system in one or more secure tokens.

12. The apparatus of claim 1, wherein the input device comprise at least one of: a fingerprint detector, a retinal scanner, a microphone, a touchscreen, and a keypad.

13. The apparatus of claim 1, wherein the antenna is configured to communicate with at least one of: an Internet network, a satellite network, a wireless LAN, a Global System for Mobile Communication (GSM), a Personal Communication Service (PCS), a Person Area Network (PAN), a Wi-Fi network, a telephone network, a cellular network, and a wireless communications network.

14. The apparatus of claim 1, wherein the connection between the device and the call center system via the antenna is a call.

15. The apparatus of claim 14, wherein the transmission of the identifying information to the call center system in an encrypted data transfer via the antenna is transmitted from the device during the call.

16. The apparatus of claim 1, wherein the connection between the device and the call center system is generated via a hyperlink received at the device and displayed on the display.

17. The apparatus of claim 1, wherein the call center system includes an interactive voice response unit.

\* \* \* \* \*